(12) United States Patent
Wan et al.

(10) Patent No.: US 9,886,982 B2
(45) Date of Patent: Feb. 6, 2018

(54) INDEX TABLE GENERATION IN PVR APPLICATIONS FOR AVC VIDEO STREAMS

(71) Applicant: Avago Technologies General IP (Singapore) Pte. Ltd., Singapore (SG)

(72) Inventors: Wade Keith Wan, Orange, CA (US); Jiang Fu, San Diego, CA (US); Xuemin Chen, Rancho Sante Fe, CA (US)

(73) Assignee: Avago Technologies General IP (Singapore) Pte. Ltd., Singapore (SG)

( * ) Notice: Subject to any disclaimer, the term of this patent is extended or adjusted under 35 U.S.C. 154(b) by 69 days.

(21) Appl. No.: 14/958,694

(22) Filed: Dec. 3, 2015

(65) Prior Publication Data

US 2016/0086634 A1 Mar. 24, 2016

Related U.S. Application Data

(62) Division of application No. 10/847,834, filed on May 18, 2004, now Pat. No. 9,208,824.

(51) Int. Cl.
*H04N 19/00* (2014.01)
*G11B 27/10* (2006.01)
(Continued)

(52) U.S. Cl.
CPC ............ *G11B 27/10* (2013.01); *G11B 27/034* (2013.01); *G11B 27/329* (2013.01); *H04N 5/76* (2013.01);
(Continued)

(58) Field of Classification Search
CPC ... H04N 19/136; H04N 19/174; H04N 19/426
(Continued)

(56) References Cited

U.S. PATENT DOCUMENTS

| | | |
|---|---|---|
| 5,121,205 A | 6/1992 | Ng et al. |
| 5,739,860 A | 4/1998 | Hoshino et al. |

(Continued)

OTHER PUBLICATIONS

JVT Editors (T. Wiegand, G. Sullivan, A. Luthra), Draft ITU-T Recommendation and Final Draft International Standard of Joint Video Specification (ITU-T Rec. H.264 | ISO/IEC 14496-10 AVC):, JVT-G050rl, Geneva, May 2003.

(Continued)

*Primary Examiner* — Jeffery Williams
(74) *Attorney, Agent, or Firm* — Foley & Lardner LLP

(57) ABSTRACT

One or more methods and systems of indexing an AVC video stream are presented. In one embodiment, the method comprises identifying one or more fields within a picture of an AVC video stream. In one embodiment, a field of the one or more fields indicates the beginning of each picture. In a second embodiment, a field of the one or more fields indicates a picture type of a picture. In a third embodiment, a field of the one or more fields indicates whether a picture is a reference or a non-reference picture. By determining that a picture is a non-reference picture, the picture may be discarded, thereby reducing the memory required to implement the indexing system while increasing the available memory size. In one embodiment, a system of indexing an AVC video stream comprises a control processor, a memory, and a set of instructions resident in the memory.

20 Claims, 3 Drawing Sheets

(51) Int. Cl.
*G11B 27/034* (2006.01)
*G11B 27/32* (2006.01)
*H04N 5/76* (2006.01)
*H04N 9/804* (2006.01)
*H04N 19/136* (2014.01)
*H04N 19/174* (2014.01)
*H04N 19/426* (2014.01)
*H04N 19/70* (2014.01)
*H04N 5/781* (2006.01)

(52) U.S. Cl.
CPC ......... *H04N 9/8042* (2013.01); *H04N 19/136* (2014.11); *H04N 19/174* (2014.11); *H04N 19/426* (2014.11); *H04N 19/70* (2014.11); *G11B 2220/20* (2013.01); *H04N 5/781* (2013.01)

(58) Field of Classification Search
USPC .................................................... 375/240.24
See application file for complete search history.

(56) References Cited

U.S. PATENT DOCUMENTS

| | | | |
|---|---|---|---|
| 5,767,797 | A | 6/1998 | Yogeshwar et al. |
| 5,838,265 | A * | 11/1998 | Adolph ................ H04N 21/242 341/50 |
| 7,139,015 | B2 | 11/2006 | Eshkoli et al. |
| 7,162,093 | B2 | 1/2007 | Regunathan et al. |
| 2005/0031308 | A1 | 2/2005 | Fu et al. |
| 2005/0053145 | A1 | 3/2005 | Hsu et al. |
| 2005/0105883 | A1 | 5/2005 | Holcomb et al. |
| 2006/0165232 | A1 | 7/2006 | Burazerovic et al. |

OTHER PUBLICATIONS

Restriction Requirement for U.S. Appl. No. 10/847,834 dated Dec. 17, 2007.
Non-Final Office Action for U.S. Appl. No. 10/847,834 dated Feb. 13, 2008.
Non-Final Office Action for U.S. Appl. No. 10/847,834 dated Jul. 24, 2008.
Final Office Action for U.S. Appl. No. 10/847,834 dated Feb. 18, 2009.
Non-Final Office Action for U.S. Appl. No. 10/847,834 dated Oct. 28, 2009.
Final Office Action for U.S. Appl. No. 10/847,834 dated Jun. 9, 2010.
Non-Final Office Action for U.S. Appl. No. 10/847,834 dated Feb. 27, 2015.
Notice of Allowance for U.S. Appl. No. 10/847,834 dated Jul. 31, 2015.

* cited by examiner

INDEX TABLE GENERATION IN PVR APPLICATIONS FOR AVC VIDEO STREAMS

RELATED APPLICATIONS/INCORPORATION BY REFERENCE

This application is a divisional of and claims priority to and the benefit of U.S. patent application Ser. No. 10/847,834, filed May 18, 2004. The entire contents of the foregoing are hereby incorporated herein by reference for all purposes.

FEDERALLY SPONSORED RESEARCH OR DEVELOPMENT

[Not Applicable]

MICROFICHE/COPYRIGHT REFERENCE

[Not Applicable]

BACKGROUND OF THE INVENTION

Personal Video Recorder (PVR) applications require the generation of index tables in order to indicate the location and type of each picture in a video stream. PVRs utilize index tables on digital video as a means to conveniently manipulate the video data by way of its hardware and software. The index tables are often stored in a storage device such as a hard drive. By utilizing these index tables, PVRs allow a user to employ one or more indexing techniques or trick modes that include time shifting, pausing and fast forwarding video to provide a more desirable viewing experience for the user. The generation of such index tables are a key component of any PVR application.

Unfortunately, the generation of such index tables may be an arduous task for AVC (Advanced Video Coding) formatted digital video streams because the AVC standard does not require the type of each picture to be coded at the picture level.

Further limitations and disadvantages of conventional and traditional approaches will become apparent to one of skill in the art, through comparison of such systems with some aspects of the present invention as set forth in the remainder of the present application with reference to the drawings.

BRIEF SUMMARY OF THE INVENTION

Aspects of the invention provide for one or more methods and systems to index the start or beginning of one or more pictures of an AVC video stream. Further aspects of the invention provide for a method and system of determining the type of picture in an AVC video stream. Other various aspects of the invention provide for increasing the available memory size of a system by assessing the use of a picture so that it may be discarded from memory after its presentation.

In one embodiment, a method of indexing one or more pictures transmitted in an AVC data stream comprises identifying a field of a slice of the one or more pictures of the AVC data stream, and determining a value provided by an identified field.

In one embodiment, a method of determining a picture type of a picture using one or more fields comprises locating the one or more fields within each of one or more slice headers of one or more slices, parsing the one or more fields, identifying one or more picture types associated with the one or more fields, determining if a first condition is satisfied, wherein the first condition assesses if each of the one or more picture types comprises a first picture type, generating a first picture type decision if the first condition is satisfied, determining if a second condition is satisfied, wherein the second condition assesses if at least one of the one or more fields comprises a second picture type, generating a second picture type decision if the second condition is satisfied, determining if a third condition is satisfied, wherein the third condition assesses if the one or more fields comprises a third picture type and not the second picture type, and generating a third picture type decision if the third condition is satisfied.

In one embodiment, a method of indexing an AVC video data stream comprises locating a first field that provides a value of the first macroblock of a slice, determining the value, locating a second field that provides a picture type indicator of the slice, and determining one or more picture types associated with the slice.

In one embodiment, a method of reducing the amount of memory required for indexing using an AVC video data stream comprises locating a field within a picture of one or more pictures of the AVC video data stream, reading the field, determining whether the picture is a reference picture or a non-reference picture based on the reading, storing the picture into a memory after its presentation, if the picture is a reference picture, and discarding the picture after its presentation, if the picture is a non-reference picture.

In one embodiment, a system of indexing an AVC video data stream comprises a control processor, a circuitry, a memory, and a set of instructions resident in the memory.

These and other advantages, aspects, and novel features of the present invention, as well as details of illustrated embodiments, thereof, will be more fully understood from the following description and drawings.

DETAILED DESCRIPTION OF THE INVENTION

Aspects of the present invention may be found in a system and method of indexing AVC (Advanced Video Coding) video data streams. The one or more systems and/or methods presented herein conform or comply with Draft ITU-T Recommendation and Final Draft International Standard of Joint Video Specification (ITU-T Rec. H.264|ISO/IEC 14496-10 AVC), which is incorporated herein by reference in its entirety. The aforementioned specification may be obtained from ISO (International Organization for Standardization), Geneva, Switzerland.

In one embodiment, the method comprises identifying one or more fields within a picture of an AVC video stream. In one embodiment, a field of the one or more fields indicates the beginning of each picture. In a second embodiment, a field of the one or more fields indicates a picture type of a picture. In a third embodiment, a field of the one or more fields indicates whether a picture is a reference or a non-reference picture. By determining that a picture is a non-reference picture, the picture may be discarded after its presentation, thereby reducing the memory required to implement the indexing system while increasing the available memory size. In one embodiment, a system of indexing an AVC video stream comprises a control processor, a memory, and a set of instructions resident in the memory. The system may be termed an AVC indexing system. The AVC indexing system may be incorporated as a subsystem into a personal video recorder (PVR) in order to facilitate indexing of the AVC video stream.

Figure 1:
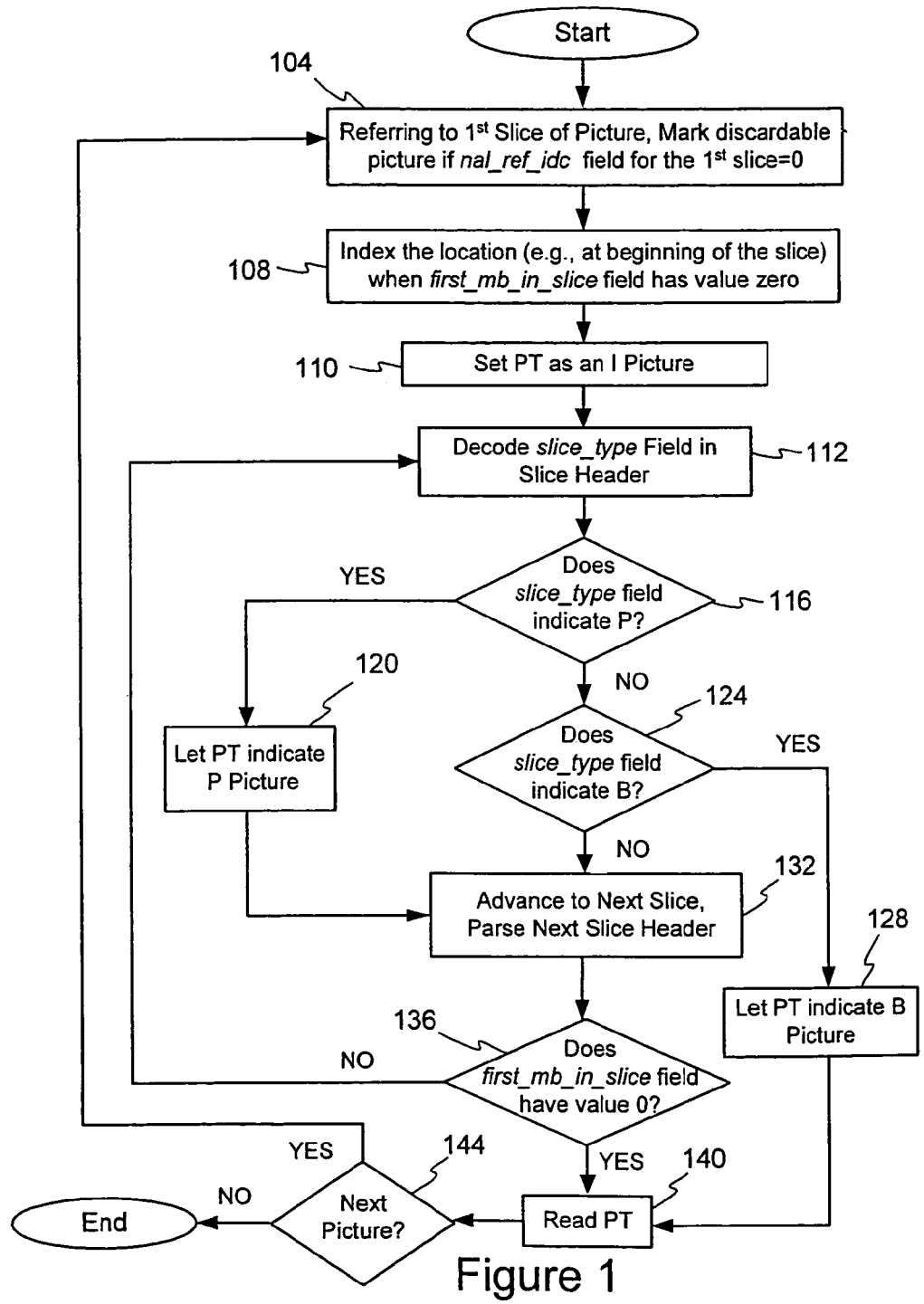
FIG. 1 is an operational flow diagram illustrating an algorithm used to index AVC video in accordance with an embodiment of the invention.

FIG. 1 is an operational flow diagram illustrating an algorithm used to index AVC video in accordance with an embodiment of the invention. At step 104, the algorithm parses a field within a picture that indicates whether the picture comprises a reference picture or a non-reference picture. The picture in which the field is parsed may comprise a first picture among one or more pictures of an AVC video stream. In one embodiment, the field is located within a NAL (network abstraction layer) unit header. In one embodiment, a reference or non-reference picture is indicated by the value of this field. In one embodiment, if the value of the field is zero, the value indicates that the picture is discardable (i.e., may be discarded after its presentation). On the other hand, a non-zero value, such as the value 1, indicates that the picture is not discardable. The field may comprise a field within a slice header of one or more slices of the picture. In one embodiment, the field may comprise a nal_ref_idc field in compliance with Draft ITU-T Recommendation and Final Draft International Standard of Joint Video Specification (ITU-T Rec. H.264|ISO/IEC 14496-10 AVC). Discarding such non-referenced pictures may reduce the memory required in the implementation of the AVC indexing system. Furthermore, discarding non-referenced pictures may increase the available memory size, thereby improving performance of the AVC indexing system and its memory dependent peripheral circuitry. During step 104, a non-reference picture may be marked as discardable using the exemplary nal_ref_idc field; as a result, it may be discarded from memory after being used. Such non-reference pictures are not used when decoding additional incoming pictures. At step 108, the location of a picture is indexed when a field within a slice of one or more slices in a picture indicates the beginning of the picture. In one embodiment, the field that indexes the start of a picture may comprise a first_mb_in_slice field in compliance with Draft ITU-T Recommendation and Final Draft International Standard of Joint Video Specification (ITU-T Rec. H.264|ISO/IEC 14496-10 AVC). For example, the location of the beginning of a picture is indexed when the contents of the first_mb_in_slice field equals the value zero. In reference to the aforementioned steps 104 and 108, the order of the steps may be interchanged such that indexing the location of a picture may occur prior to marking a picture discardable. At step 110, a variable, termed PT (i.e., implying picture type) is initialized with a value corresponding to an I picture. The variable, PT, is used to store one or more values that indicate picture type. The picture type is indicated by examining one or more fields in a slice header of one or more slices in a picture. The field of the slice header is parsed and examined by the AVC indexing system. In the flow diagram of FIG. 1, the variable PT may correspond to a register or location within a memory of the AVC indexing system that stores a value that corresponds to a particular picture type. In one embodiment, the picture type may comprise a B, I, or P type of picture, as defined in Draft ITU-T Recommendation and Final Draft International Standard of Joint Video Specification (ITU-T Rec. H.264|ISO/IEC 14496-10 AVC). Prior to parsing and examining the first slice of the picture by the AVC indexing system, the variable PT, by default, stores a value that corresponds to an I picture. At step 112, the AVC indexing system performs a decode of a field of a slice in a picture; in one embodiment the field comprises a slice_type field. The slice may comprise a first slice of a picture of an AVC video stream. At step 116, the first slice of the picture is examined in terms of the picture type. For example, the contents of the slice_type field within the slice is examined to see if the associated picture is a P picture. If the slice_type field indicates that the picture type is a P type of picture, then the variable PT is set to a value that corresponds to that of a P picture, as illustrated in step 120. Otherwise, the process proceeds to step 124, in which, an assessment is made whether the slice indicates that the picture is a B picture. If the slice_type field indicates that the picture is indeed a B picture, the process proceeds to step 128, in which the variable PT is set to a value that corresponds to a B picture. Otherwise, at step 132, the next slice header of the next slice in the picture is parsed. Next, at step 136, the AVC indexing system determines if the next slice is the first slice in the next picture. In one embodiment, as previously mentioned, the start (or first slice) of a picture is indexed when the first_mb_in_slice field has value equal to zero. For example, the AVC indexing system decodes the data in the first_mb_in_slice field to determine if the slice corresponds to the first slice in the picture. If the first_mb_in_slice is not equal to zero, the next slice is not the first slice of the next picture, and the process jumps back to step 112, in which the slice_type field of the next slice is decoded. If, on the other hand, the first_mb_in_slice field is equal to zero, the process proceeds at step 140. At step 140, the value of PT is read or decoded in order to determine the picture type. At step 144, the AVC indexing system determines whether additional picture(s) need to be processed by the AVC indexing system. If there are additional pictures, the process proceeds at steps 104/108, in which the discardability of a picture is ascertained and indexing of the starting location of the next picture is performed. Otherwise, if the current picture comprises the last picture in the AVC video stream, the process ends.

The following table provides an example of the values of the parameters (or variables) used in the algorithm previously described in FIG. 1. These parameters comprise the first_mb_in_slice, slice_type, and nal_ref_idc fields.

TABLE #1

|  | Picture 0 (I-Picture) | | | Picture 1 (B-Picture) | | | Picture 2 (P-Picture) | | | Picture 3 (B-Picture) | | | |
| --- | --- | --- | --- | --- | --- | --- | --- | --- | --- | --- | --- | --- | --- |
| first_mb_in_slice | 0 | 4 | 21 | 0 | 15 | 28 | 0 | 10 | 20 | 0 | 5 | 15 | 24 |
| slice_type | I | I | I | B | P | B | I | P | P | P | B | I | P |
| nal_ref_idc | 1 | 1 | 1 | 0 | 0 | 0 | 1 | 1 | 1 | 0 | 0 | 0 | 0 |
| Slice Parsed By Algorithm | 1 | 2 | 3 | 4 | | | 5 | 6 | 7 | 8 | 9 | | |
| Discardable picture | No | | | Yes | | | No | | | Yes | | | |

Table #1 comprises five rows. The first row comprises entries that provide the macroblock number of the first macroblock in each slice of a picture. As indicated in Table #1, the first macroblock of each slice is indexed. For example, picture #0 has three slices, in which, the first macroblock of the three slices are located at macroblock #0, #4, and #21. The second row comprises entries that provide the slice type of a particular slice as determined by the slice_type field in the slice header of a picture. As illustrated in Table #1, picture #0 comprises an I picture because, the slice_type field of each slice indicates that the picture type is an I picture. In picture #1, for example, the picture is determined to be a B picture immediately because the first slice indicates that the picture type is a B picture. The third row comprises entries that provide an indication whether the slice is associated with a reference picture or a non-reference picture. As discussed previously, if the picture is determined to be a non-reference picture, it may be discarded after presentation. Otherwise, the picture is a reference picture that may be utilized in the decoding of subsequent pictures. As illustrated in Table #1, the values for the nal_ref_idc field are consistent throughout all slices within a picture. As mentioned earlier, when nal_ref_idc=0, the picture is discardable. The fourth row comprises entries that indicate the slice number parsed by the algorithm. As illustrated in Table #1, the second and third slices of picture #1 are not parsed and analyzed because the first slice has determined that picture #1 is a B picture. Hence the picture is categorized as a B picture, and the process proceeds with the reading of the next picture (picture #2). As soon as the algorithm determines the picture is a B picture, additional slices in the picture need not be analyzed, and the algorithm jumps to the next picture. This may be further observed using the second slice of picture #3; the picture is determined to be a B picture at the second slice. As a consequence, the third and fourth slices of picture #3 do not need to be further parsed and analyzed. In reference to picture #2, all slices are parsed and analyzed since there are no slices that indicate the picture is a B type of picture. Picture #2 is categorized as a P picture since there is at least one slice that indicates that picture #2 is a P picture while there are no slices that indicate that picture #2 is a B picture. The fifth row of Table #1 indicates whether the associated picture is discardable, and is directly related to the third row of Table #1. For example, if nal_ref_idc=0 as shown in picture #1, the picture is discardable, and is indicated by a "yes". In another example, if nal_ref_idc=1, as shown in picture #2, the picture is not discardable, and is indicated by a "no".

Figure 2:
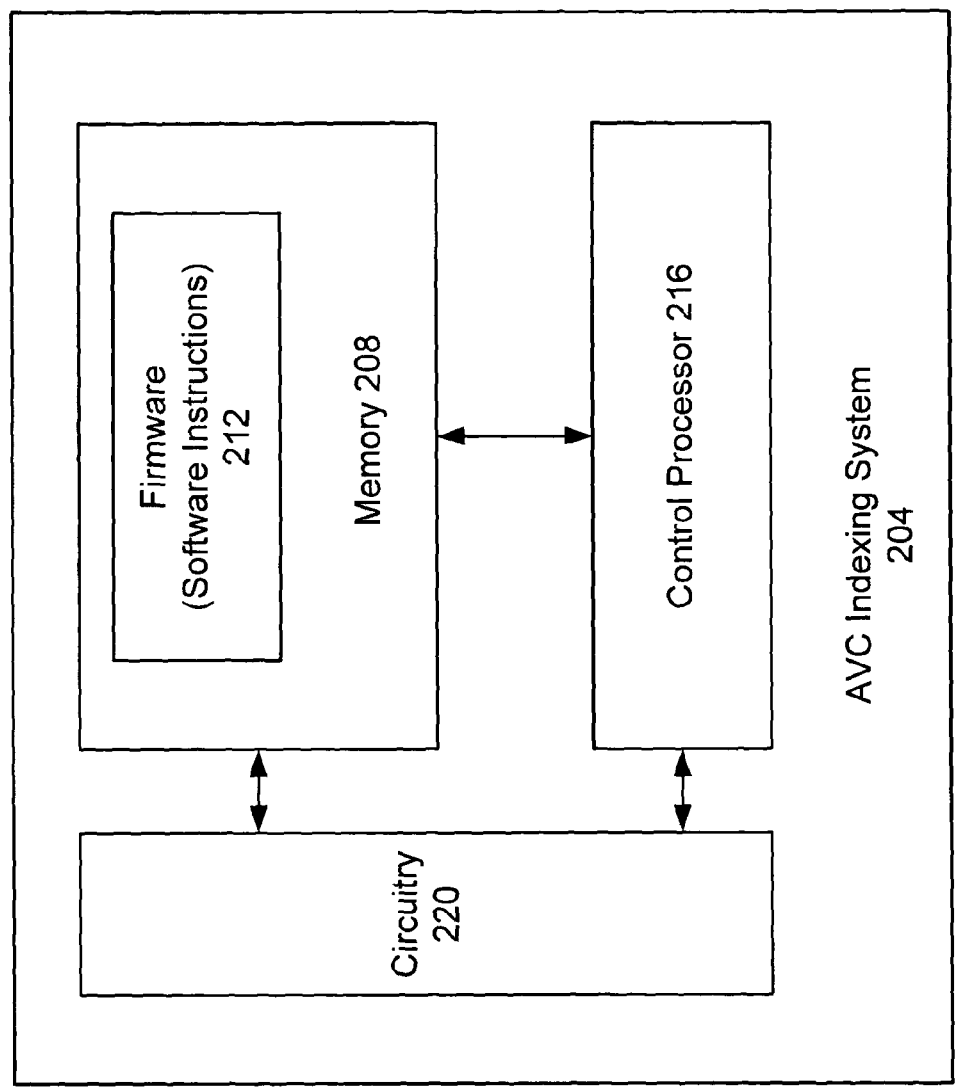
FIG. 2 is a block diagram of an AVC indexing system in accordance with an embodiment of the invention.

FIG. 2 is a block diagram of an AVC indexing system 204, in accordance with an embodiment of the invention. The AVC indexing system 204 comprises a memory 208, a control processor 216, and circuitry 220. As shown, a set of software instructions or firmware 212, resident in the memory 208, is executed by way of processing performed by the control processor 216. AVC video data may be received and processed by the circuitry 220 by way of execution of the firmware 212 resident in the memory 208. The memory 208 may comprise a read only memory (ROM) such as a non-volatile ROM. The circuitry 220 may comprise one or more interfaces and logic devices used in the processing of data in relation to the operational flow diagram of FIG. 1. The firmware 212 may facilitate data processing of the AVC video stream in relation to the steps performed in FIG. 1. Use of the AVC indexing system 204 facilitates the indexing of picture position, picture type, and discardability information of one or more pictures in an AVC video stream. In addition, the circuitry 220 may comprise one or more logic devices that facilitate the generation of a PVR index table that incorporates the picture position information, picture type, and discardability information. The PVR index table is stored in a storage device such as a hard disk drive.

Figure 3:
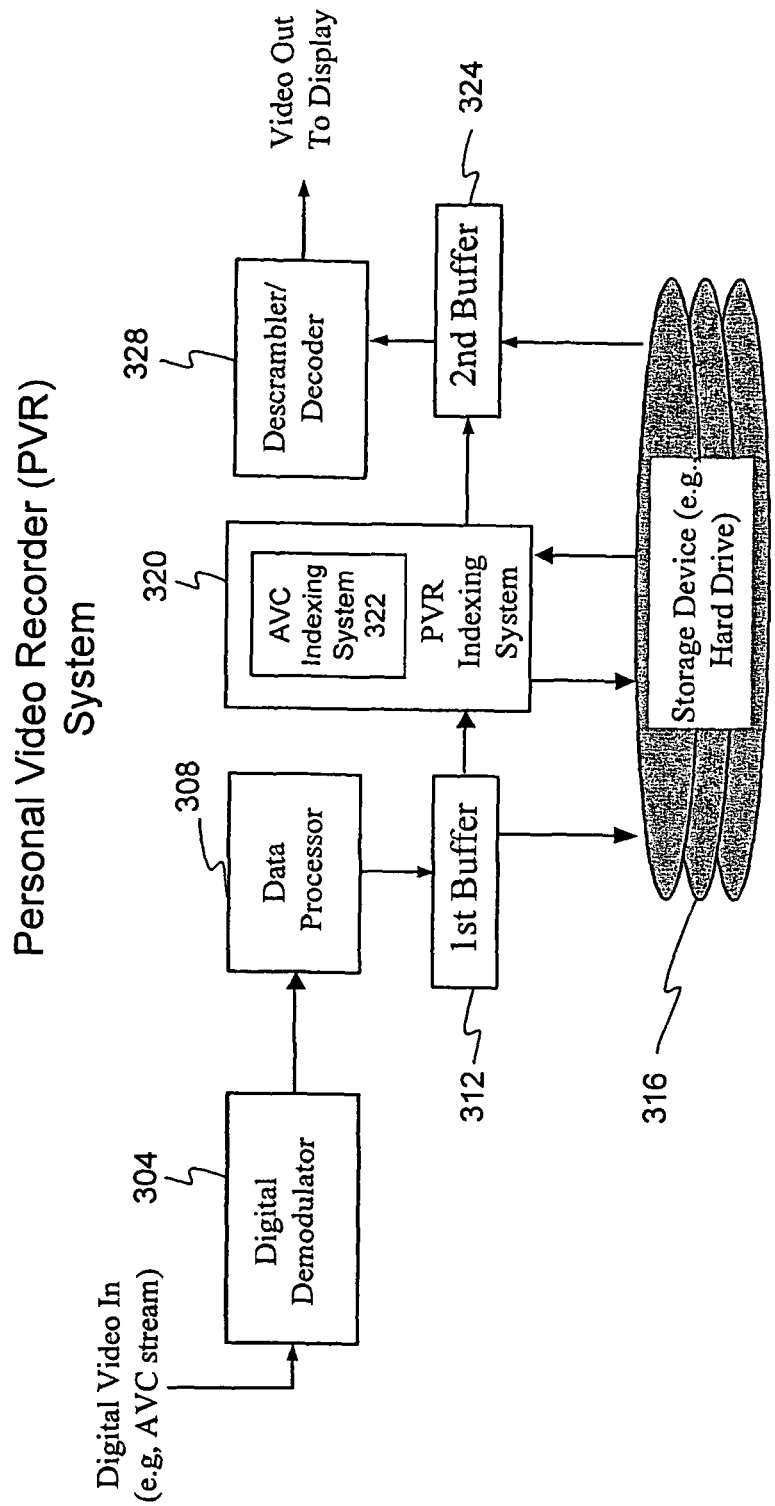
FIG. 3 is a relational block diagram of a personal video recorder (PVR) system incorporating the AVC indexing system referenced in FIG. 2, in accordance with an embodiment of the invention.

FIG. 3 is a relational block diagram of a personal video recorder (PVR) system incorporating the AVC indexing system referenced in FIG. 2, in accordance with an embodiment of the invention. The PVR system comprises a digital demodulator 304, a data processor 308, a first data buffer 312, a storage device 316, a PVR indexing system 320 comprising the AVC indexing system 322, a second data buffer 324, and a descrambler/decoder 328. As illustrated in FIG. 3, a digital video stream is input in the digital demodulator 304. In one embodiment, the digital video stream comprises an AVC (i.e, H.264 or NT) type of digital video stream. The AVC video stream may be received from a telecommunications operator or carrier. One or more selectable video programs or channels may be delivered from the AVC video stream. In this embodiment, the digital demodulator 304 functions to demodulate a received digital video stream to an appropriate baseband signal. Thereafter, the baseband video signal is received by a processor such as the data processor 308. The data processor 308 selects a particular program or channel by filtering out AVC video data, for example, and subsequently decrypting the filtered data. Next, the data processor 308 may reconfigure the filtered data and subsequently store the reconfigured data in the first data buffer 312. The first data buffer 312 facilitates recording or writing of the filtered AVC data into the storage device 316. The storage device 316 may comprise an exemplary hard disk drive or other comparable device.

While recording to a storage device 316, the AVC indexing system 322 may optionally employ the algorithm described and referenced in FIG. 1, in order to effectively and efficiently index, type, and determine the discardability of the one or more pictures received from the AVC video stream. The values of the parameters of the algorithm (described in reference to FIG. 1) may be stored within the storage device 316. For example, the start (or beginning) of the one or more pictures may be determined, and its position information may be stored in the storage device 316 by way of control provided by the AVC indexing system 322. In addition, a picture's picture type (I, P, or B) and its discardability may be stored in the storage device 316. Information such as position information, picture type, and discardability attributes may be used to generate a PVR index table. The index table, of course, is used to facilitate various trick modes and indexing techniques. The AVC indexing system 322 facilitates the generation of the index table, improving AVC video playback functionality and operational performance of the PVR system. The PVR indexing system 320 may comprise one or more types of indexing systems, in addition to the AVC indexing system 322. The second buffer 324 facilitates delivery of AVC video data into the descrambler/decoder 328. Any timing changes resulting from control provided by the PVR indexing system 320 or AVC indexing system 322 are obviated using the second buffer 324. The selected program or channel is subsequently descrambled/decoded by the descrambler/decoder 328. Thereafter, the program or channel is displayed by a monitor or television or any appliance capable of visually providing the selected video to a viewer. It is contemplated that one or more of the elements 304, 308, 312, 316, 320, 322, 324, 328 described in FIG. 3 may be incorporated into a set-top-box in order to interface and process any AVC data stream provided by the telecommunications operator.

While the invention has been described with reference to certain embodiments, it will be understood by those skilled in the art that various changes may be made and equivalents may be substituted without departing from the scope of the invention. In addition, many modifications may be made to adapt a particular situation or material to the teachings of the invention without departing from its scope. Therefore, it is intended that the invention not be limited to the particular embodiment disclosed, but that the invention will include all embodiments falling within the scope of the appended claims.

What is claimed is:

1. A method of determining a picture type of a picture comprising a plurality of slices, the method comprising:
    locating, using one or more processors, a type field in each slice of the plurality of slices of the picture, wherein the type field comprises an indicator of a picture type;
    determining, using the one or more processors, that the picture is of a first picture type in response to the indicator in the type field in each slice of the plurality of slices indicating the first picture type;
    determining, using the one or more processors, that the picture is of a picture type other than the first picture type in response to the indicator in the type field in at least one slice of the plurality of slices indicating a picture type other than the first picture type; and
    indexing, using the one or more processors, a digital video stream based at least in part on the determined picture type of the picture.

2. The method of claim 1, further comprising:
    determining that the picture is of a second picture type in response to the indicator in the type field in at least one slice of the plurality of slices indicating the second picture type; and
    determining that the picture is of a third picture type in response to the indicator in the type field in at least one slice of the plurality of slices indicating the third picture type and none of the indicator in the type field in each of the plurality of slices indicating the second picture type.

3. The method of claim 1, wherein the first picture type comprises an I picture type.

4. The method of claim 3, wherein the I picture type is defined in ITU-T Rec. H.264|ISO/IEC 14496-10 AVC.

5. The method of claim 2, wherein the first picture type comprises an I picture type, the second picture type comprises a B picture type, and the third picture type comprises a P picture type.

6. The method of claim 5, wherein the I picture type, the B picture type, and the P picture type are defined in ITU-T Rec. H.264|ISO/IEC 14496-10 AVC.

7. The method of claim 1, further comprising parsing the type field in each of the plurality of slices.

8. A system, comprising:
    at least one processor; and
    a memory, wherein the memory stores a set of instructions, the set of instructions when executed by the at least one processor, causing the at least one processor to perform operations comprising:
    locating a type field in each slice of a plurality of slices of a picture, wherein the type field comprises an indicator of a picture type;
    determining that the picture is of a first picture type in response to the indicator in the type field in each slice of the plurality of slices indicating the first picture type;
    determining that the picture is of a picture type other than the first picture type in response to the indicator in the type field in at least one slice of the plurality of slices indicating a picture type other than the first picture type; and
    indexing a digital video stream using the determined picture type of the picture.

9. The system of claim 8, wherein the set of instructions when executed by the at least one processor, causing the at least one processor to perform operations further comprising:
    determining that the picture is of a second picture type in response to the indicator in the type field in at least one slice of the plurality of slices indicating the second picture type; and
    determining that the picture is of a third picture type in response to the indicator in the type field in at least one slice of the plurality of slices indicating the third picture type and none of the indicator in the type field in each of the plurality of slices indicating the second picture type.

10. The system of claim 8, wherein the first picture type comprises an I picture type.

11. The system of claim 10, wherein the I picture type is defined in ITU-T Rec. H.264|ISO/IEC 14496-10 AVC.

12. The system of claim 9, wherein the first picture type comprises an I picture type, the second picture type comprises a B picture type, and the third picture type comprises a P picture type.

13. The system of claim 12, wherein the I picture type, the B picture type, and the P picture type are defined in ITU-T Rec. H.264|ISO/IEC 14496-10 AVC.

14. The system of claim 8, wherein the set of instructions when executed by the at least one processor, causing the at least one processor to perform operations further comprising parsing the type field in each of the plurality of slices.

15. A method, comprising:
    identifying, using one or more processors, a beginning of a picture when a first field of a slice of a plurality of slices of the picture holds a first value; and
    determining, using the one or more processors, whether the picture is an I picture, a P picture, or a B picture, the determining comprising:
    decoding a second value within a second field of the slice, the second value indicating whether the slice corresponds to a I picture type, a P picture type, or a B picture type;
    advancing to a next slice of the picture when the slice corresponds to the I picture type or the P picture type;
    advancing to a next picture if the next slice of the picture comprises the first field, the first field holding the first value; and
    advancing to the next picture if the slice corresponds to the B picture type.

16. The method of claim 15, further comprising:
    discarding the picture if the slice of the picture corresponds to the B picture type.

17. The method of claim 15, further comprising:
    determining whether the picture is a discardable picture using a third field of the slice.

18. The method of claim 17, further comprising:
    indexing an AVC video data stream using at least one of the beginning of the picture, the picture type of the picture, or the determination whether the picture is a discardable picture.

19. The method of claim 17, further comprising:
generating a personal video recorder (PVR) index table including at least one of picture position information indicating the beginning of the picture, the picture type of the picture, or discardability information indicating whether the picture is a discardable picture.

20. The method of claim 15, wherein the I picture type, the P picture type, and the B picture type are defined in ITU-T Rec. H.264|ISO/IEC 14496-10 AVC.

\* \* \* \* \*